United States Patent Office 3,126,344
Patented Mar. 24, 1964

3,126,344
SYNTHETIC ESTER LUBRICATING OIL
COMPOSITION
Alfred H. Matuszak, Westfield, and Stephen J. Metro, Scotch Plains, N.J., assignors to Esso Research and Engineering Company, a corporation of Delaware
No Drawing. Filed Jan. 3, 1961, Ser. No. 80,008
6 Claims. (Cl. 252—51.5)

This invention relates to synthetic ester lubricating oil compositions. Particularly, the invention relates to synthetic ester lubricating oil compositions wherein the base oil comprises a mixture of a triester of a trihydroxy alcohol in conjunction with a complex ester, said complex ester being prepared by reacting dicarboxylic acid with glycol having no beta hydrogen and monohydric alcohol also having no beta hydrogen.

The use of various diesters, polyesters and complex esters as lubricating oils is well known to the art and has been described in various patents, e.g. U.S. 2,723,286; 2,743,234 and 2,575,196. These ester oils are characterized by viscosity properties that are outstanding at both low and high temperatures, and in this respect are superior to the mineral oils. Because of their utility over extremely wide temperature ranges, the synthetic ester lubricating oils are widely used in the formulation of lubricants for aircraft engines such as "turbo-jet," "turbo-prop," "pure-jet" and "turbo-fan" engines. Recently, however, because of the more severe operating conditions associated with newer types of these engines, wherein the lubricant is subjected to higher temperature, ester oil compositions having improved thermal stability have become desirable. It has been found that one of the factors affecting thermal stability adversely is the presence of hydrogen groups on the beta-carbon atom of the alcohol or hydroxy compound used in the preparation of esters. One class of esters found to possess particularly good heat or thermal stability are triesters prepared from $C_4$ to $C_{12}$ monocarboxylic acid and trihydroxy materials of the type of alkyl trimethylol alcohols. Esters of this sort have no beta hydrogen adjacent to the ester linkages and have been found to be very stable at high temperatures. Such esters, however, are lacking in several other desired properties. For example, their load-carrying ability is not particularly high and their viscosities are too low to meet certain military specifications. In order to increase the viscosity and to improve the load-carrying ability, it has been found that these triesters may be advantageously mixed with complex esters prepared from dicarboxylic acids, no beta hydrogen alcohol and 1,3-glycols in which the beta hydrogen has been replaced by alkyl groups. These complex esters because of their greater chain length, as compared to the aforementioned triesters, have a higher viscosity and can be used to increase the viscosity of the triesters. In addition, they have higher load-carrying ability than the triesters.

THE TRIESTER OILS

The triesters operable in the present invention are those having the general formula:

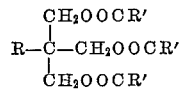

wherein R represents a straight or branched chain alkyl group of 1 to 8 carbon atoms and each R' represents the same or different alkyl group, either branched or straight chain, which contains 3 to 11 carbon atoms. Esters of the above type can be formed by conventional esterification techniques applied to trimethylol alkanes and $C_4$ to $C_{12}$ straight or branched chain monocarboxylic acids. Examples of operable trimethylol alkanes include trimethylol ethane, trimethylol propane, trimethylol heptane, trimethylol isooctane, trimethylol decane, etc. Examples of the monocarboxylic acids used to form the triester include n-butanoic acid, caproic acid, heptanoic acid, caprylic acid, 2-ethylhexanoic acid, pelargonic acid, lauric acid, etc.

THE COMPLEX ESTER OILS

The second component of the compositions of the invention is a complex ester oil formed by the reaction of dicarboxylic acid with neo glycol and neo alcohol, i.e. glycol and alcohol having no beta hydrogen. The complex esters, per se, can be represented by the general formula:

wherein $R_1$ and $R_5$ are alkyl radicals of monohydric alcohol having no beta hydrogen, $R_2$ and $R_4$ are hydrocarbon radicals of dicarboxylic acid, and $R_3$ is the divalent hydrocarbon or hydrocarbon-oxy radical of a glycol or polyglycol, which glycol or polyglycol has no beta hydrogen. "$n$" in the complex ester molecule will usually range from 1 to 6 depending upon the product viscosity desired which is controlled by the relative molar ratio of the glycol or polyglycol to the dicarboxylic acid. In preparing the complex ester, there will always be some simple ester formed, i.e. $n=0$, but this will generally be a minor portion, e.g. 10 to 40 wt. percent of the esterification reaction product.

Some specific materials used in preparing the above types of complex esters are as follows: Neo alcohols having 6 to 13 carbon atoms such as 2,2,4-trimethylpentanol-1; 2,2-dimethylhexanol-1; 2,2-dimethylpentanol-1; 1-methylcyclohexylmethanol; 2,2-dimethylbutanol-1; 2,2-dimethyldecanol-1; $C_6$ to $C_{12}$ dicarboxylic acids such as sebacic, adipic, azelaic and dodecanedioic acid; neo glycols such as 2,2-dimethylpropane-diol-1,3; 2-ethyl-2-butylpropanediol-1,3; 2,2-diethylpropanediol-1,3; 2,2-dimethylbutanediol-1,3; etc. In general, the complex esters will have a total of 20 to 80, preferably 40 to 65, carbon atoms per molecule. Complex esters and methods for their preparation are known in the art and have been described in various patents. Preferably the complex esters are prepared by reacting 1 mole of glycol, 2 moles of dicarboxylic acid and 2 moles of alcohol. This will result in about 35 wt. percent of diester of the dicarboxylic acid and alcohol and about 65 wt. percent of complex ester of the formula: Alcohol—Acid—(Glycol—Acid)$_x$—Alcohol, where $x$ averages about 1.8. By varying the amount of reactants, varying ratios of diester to complex ester are obtained. In general, 0.3 to 2.4 moles of alcohol and 1 to 2 moles of acid can be reacted per mole of glycol.

In carrying out the esterification, the glycol, acid and alcohol may be added to the reactor and heated under reflux conditions until the stoichiometric amount of water is taken off. Generally, a water entraining agent such as heptane or toluene is used. Acid, basic or neutral esterification catalysts can be used, for example, sodium bisulfate, sulfuric acid, toluene sulfonic acid, sodium methylate, calcium oxide etc. Or the esterification can be carried out with no catalyst. When the esterification reaction is complete, the reaction mixture can be vacuum stripped to remove any entraining agent remaining as well as other volatile materials. If an acid catalyst has been used it may be desirable to filter the reaction mixture and/or to neutralize it with a dilute alkaline solution, such as sodium carbonate, followed by water washing. The ester may again be vacuum stripped in order to remove any water contamination, unreacted alcohol, etc.

It is also possible to form the complex ester by forming a half ester by reaction of equal molar proportions of dicarboxylic acid and alcohol, followed by a second reaction in which the resulting half ester is reacted with the glycol. Still other variations are possible, for example, first reacting the dicarboxylic acid and glycol, and then reacting with alcohol. All the above techniques are known in the art of forming complex type esters and the particular technique used is not essential to the present invention.

Various other additives can also be added to the lubricating compositions of the invention in amounts of about 0.001 to 10.0 weight percent each, based on the total weight of the composition. Examples of such additives include: rust preventives such as calcium petroleum sulfonate; V.I. improvers such as the polymethacrylates; oxidation inhibitors such as phenyl-alpha-naphthylamine, para-amino diphenyl-amine, 3,7-dioctyl phenothiazine, p,p'-dioctyl diphenylamine, phenothiazine, etc.; corrosion inhibitors such as sorbitan monooleate; load carrying agents such as tricresyl phosphate and free sebacic acid; pour point depressants; dyes, grease thickeners; other ester oils; other synthetic lubricating oils; and the like.

A particularly desirable type of additive is the viscosity index improvers which also have detergency properties. These materials are very effective in maintaining a clean engine during operation. In general, the detergent V.I. improvers are polymeric materials generally having viscosities at 210° F. of less than 700 centistokes. They generally consist of a carbon to carbon backbone having various side chains which impart to the polymer its viscosity index and detergency properties. One type of such polymers are those prepared by copolymerizing a polar monomer with various unsaturated ester monomers. These ester monomers can be esters of unsaturated mono- or dicarboxylic acid or esters of unsaturated alcohols. The polar monomers include 2-N-vinylpyrrolidone, maleic anhydride, etc.

The unsaturated esters are prepared from $C_2$ to $C_6$ mono- or di-carboxylic acid and $C_2$ to $C_{20}$ aliphatic alcohols. One of the acids or alcohols contains an ethylenic unsaturation, while the other of the acids or alcohols is usually saturated. About 1 to 20 mol percent of the polymer will be the polar monomer, while the remainder is the ester monomer. The copolymerization is generally carried out by using peroxide type catalysts, such as benzoyl peroxide, under conventional conditions.

To illustrate, among these polymeric materials are: copolymers of vinyl acetate, alkyl fumarates and maleic anhydride; copolymers of acrylates or methacrylates with maleic anhydride or 2-N-vinyl pyrrolidone; copolymers of vinyl acetate, alkyl fumarates and 2-N-vinyl pyrrolidone; etc. A more specific example is a copolymer formed by polymerizing 30 to 70 wt. percent of vinyl acetate with 60 to 20 wt. percent of an alkyl fumarate mixture and 0.1 to 10.0 wt. percent of maleic anhydride or 2-N-vinyl pyrrolidone using a benzoyl peroxide catalyst, and wherein the alkyl fumarates consist of a mixture of about 10 to 40 wt. percent of a di-$C_8$ Oxo fumarate and 60 to 90 wt. percent of a di-tallow fumarate. Another specific copolymer, which was used in the working examples of the invention, is commercially available under the name "Acryloid HF-866." This material is a copolymer of an acrylate and 2-N-vinyl pyrrolidone having a nitrogen content of 0.25–0.35% and a viscosity range of 400 to 700 cs. at 210° F.

The base oil of the invention will preferably consist of about 40 to 70 volume percent of the triester with about 60 to 30 volume percent of the complex ester material. Particularly preferred are compositions containing 50 to 60 volume percent of the triester and 40 to 50 volume percent of the complex ester material. The complex ester material can be either pure complex ester or mixtures consisting of about 60 to 99 wt. percent pure complex ester with the remainder being diester. Preferably, the composition will also contain 2 to 10 wt. percent of anti-oxidant and 0 to 3 wt. percent of detergent V.I. improver, said weight percentages being based on the total weight of the final composition.

The invention will be further understood by the following example:

EXAMPLE 1

A reactor was charged with one molar amount of 2,2-dimethylpropanediol-1,3; two molar amounts of sebacic acid and two molar amounts of 2,2,4-trimethylpentanol. Next, was added 0.25 wt. percent of $NaHSO_4$ as a catalyst and 5 wt. percent of heptane as a water entraining agent, said weight percents being based on the total charge. The mixture was then refluxed at atmospheric pressure for 8 hours during which time the calculated amount of water for complete esterification was distilled over. The resulting oil residue was stripped at 215° C. under 50 mm. mercury. The residue was filtered free of catalyst and washed. The residue was then stirred with 10 wt. percent of F-1 grade alumina for 8 hours at 140° F. and then filtered free of alumina. The F-1 alumina is an activated alumina which is a porous form of alumina oxide ($Al_2O_3$) of relatively high purity. Typical analysis and properties are as follows.

| Analysis (wt. percent): | F–1 alumina |
|---|---|
| Alumina ($Al_2O_3$) | 92.0. |
| Soda ($Na_2O$) | <0.8. |
| Silica ($SiO_2$) | <0.1. |
| Titania $TiO_2$) | <0.02. |
| Iron oxide ($Fe_2O_3$) | <0.10. |
| Moisture (loss on ignition) | 7.00. |
| Density (approximate) | 50 lbs./cubic foot. |

Some properties of the resulting product are summarized in the following table.

*Table I*

| | |
|---|---|
| Vis., cs., at: | |
| 210° F. | 11.10 |
| 100° F. | 66.1 |
| −40° F. | 31,615 |
| Sp. gr., 60/60° F. | 0.9554 |
| Flash pt., ° F. | 435 |
| Pour pt., ° F. | −65 |
| Total acid No. (mg. KOH/gm.) | 0.08 |
| Overall yield, percent | 76.5 |

The resulting complex ester material consisted of about 35 wt. percent of di-(2,2,4-trimethylpentanyl) sebacate and about 65 wt. percent of complex ester of the formula: Alcohol—(Acid—Glycol)$_n$—Acid—Alcohol, where said Alcohol is the 2,2,4-trimethylpentanol, said Acid is sebacic acid, said Glycol represents the 2,2-dimethylpropanediol-1,3, and $n$ averages about 1.8.

A finished lubricant composition was prepared by mixing 55 volume percent of triester formed by fully esterifying trimethylol propane with pelargonic acid, and 45 volume percent of the complex ester material described above. To this mixture was added 1 wt. percent of Acryloid HF–866 and 2 wt. percent of phenyl-alpha-naphthylamine. The above composition was submitted to a number of tests and the results obtained are summarized in Table II which follows. The table contains the usual standard tests, as well as various tests which are described in various military specifications for aircraft lubricating oils, namely MIL–9236A, MIL–7808D and DERD 2497.

Table II

| | |
|---|---|
| Specific gravity at 60° F. | 0.953. |
| Vis., cs., ° F.: | |
| 400 | 2.0. |
| 210 | 7.92. |
| 100 | 43.8. |
| −40 | 14,359. |
| "H" rubber swell, percent (MIL-9236B) | 19. |
| Ryder gear test, lbs./in. (MIL-L-7808D) | 2500 (4 sides). |
| Deposition test (MIL-9236B) | 0.85. |
| 400° F. evap. loss, percent (MIL-7808D) (sea level) | 5.9. |
| 400° F. evap. loss, percent (ASTM D-972) (40,000 ft. alt.) | 17. |
| Flash point, ° F. | 470. |
| Actual pour point, ° F. | −80. |
| Foam test (MIL-9236B): | |
| Sequence I | 30/0. |
| Sequence II | 25/0. |
| Sequence III | 20/0. |
| 500° F. oxidation corrosion (MIL-9236A) test (48 hours) (mg./sq. cm.): | |
| Cu | −0.78. |
| Ti | +0.01. |
| Fe | −0.13. |
| Al | −0.02. |
| Ag | 0.0. |
| Oxidized oil, K.V. at 100° F. | 87.5. |
| T.A.N. of oxidized oil | 18.8. |
| Thermal stability at 617° F. (DERD 2497): | |
| Vis. change at 210° F., percent | −4.9. |
| Loss, percent volume | 10. |
| Spontaneous ignition (MIL-9236B) temperature, ° F. | 820. |
| Total acid No. (mg./KOH/gm.) (ASTM D-974) | 0.11. |
| Specific heat, B.t.u./lb./° F. | 210° F., 0.512; 388.8° F., 0.630. |

What is claimed is:

1. A lubricating base oil composition comprising:
   (a) about 40 to 70 volume percent of triester of the general formula:

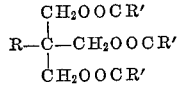

wherein R is $C_1$ to $C_8$ alkly group and R' is $C_3$ to $C_{11}$ alkyl group, and
   (b) about 60 to 30 volume percent of a complex ester material, said complex ester material consisting essentially of:
      (I) About 60 to 100 weight percent of complex ester of the general formula:

$$R_1-OOCR_2COO-(R_3-OOCR_4COO)_n-R_5$$

wherein $R_1$ and $R_5$ are alkyl radicals of neo alcohol having 6 to 13 carbon atoms; $R_2$ and $R_4$ are hydrocarbon radicals of 4 to 10 carbons; $R_3$ is a hydrocarbon radical of a 1,3-glycol having no beta hydrogen and containing at least 5 carbon atoms; $n$ is from 1 to about 6; and wherein said complex ester contains 40 to 65 carbon atoms per molecule, and
      (II) the remainder of said complex ester material being diester of the formula:

$$R_1-OOCR_2COO-R_5$$

wherein $R_1$ and $R_5$ are alkyl radicals of neo alcohol having 6 to 13 carbon atoms, and $R_2$ is a hydrocarbon radical containing from 4 to 10 carbon atoms.

2. A lubricating base oil composition as defined in claim 1 wherein said complex ester material consists essentially of said complex ester, per se.

3. A lubricating base oil composition as defined in claim 1 wherein:
   (a) said triester is the ester resulting from fully esterifying trimethylol propane with pelargonic acid;
   (b) wherein said complex ester, per se, is formed from 2,2,4-trimethyl pentanol, sebacic acid and 2,2-dimethyl propanediol-1,3, and $n$ averages about 1.8; and
   (c) wherein said diester is di(2,2,4-trimethyl pentyl) sebacate.

4. A lubricating oil composition comprising a major amount of the base oil composition of claim 1 and from 2 to 10 weight percent of an oxidation inhibitor.

5. A lubricating oil composition as defined in claim 4 which also contains up to 3 weight percent of a detergent V.I. improver.

6. A lubricating composition consisting essentially of a major amount of the base oil composition of claim 3, from 2 to 10 weight percent of phenyl alpha naphthylamine and up to 3 weight percent of a detergent V.I. improver which is a copolymer of an acrylate and 2-N-vinyl pyrrolidone.

References Cited in the file of this patent

UNITED STATES PATENTS

| | | |
|---|---|---|
| 2,499,984 | Beavers et al. | Mar. 7, 1950 |
| 2,798,083 | Bell et al. | July 2, 1957 |
| 2,820,815 | Matuszak et al. | Jan. 1, 1958 |
| 2,857,421 | Matuszak et al. | Oct. 21, 1958 |
| 2,889,354 | Blake et al. | June 2, 1959 |
| 2,991,252 | Pethrick et al. | July 4, 1961 |

FOREIGN PATENTS

| | | |
|---|---|---|
| 158,053 | Australia | Aug. 4, 1954 |
| 231,622 | Australia | Nov. 21, 1960 |

OTHER REFERENCES

Barnes et al.: Lubrication Engineering, August 1957, pp. 454–458.